United States Patent

Oki et al.

[11] Patent Number: 5,859,969
[45] Date of Patent: *Jan. 12, 1999

[54] REMOTE INSTALLATION SYSTEM AND METHOD

[75] Inventors: Hiroshi Oki; Shinji Kamata; Takashi Hara; Toshiro Okada; Toshiya Yamazaki; Norihiko Igarashi, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 585,017

[22] Filed: Jan. 11, 1996

[30] Foreign Application Priority Data

Jan. 10, 1995 [JP] Japan .................................. 7-001797

[51] Int. Cl.⁶ ............................ G06F 13/00; G06F 12/00
[52] U.S. Cl. .................................. 395/200.3; 395/200.31; 395/712; 345/146; 345/353; 345/356; 705/26; 705/27; 707/10; 707/104
[58] Field of Search ........................ 395/200.01, 200.03, 395/200.09, 226, 601, 610, 712, 609, 615, 200.3, 200.31, 200.47, 200.33; 707/1, 9, 10, 104, 203, 511, 514; 345/353, 356, 146, 348; 705/27, 26

[56] References Cited

U.S. PATENT DOCUMENTS

| | | | |
|---|---|---|---|
| 4,999,806 | 3/1991 | Chernow et al. | 395/712 |
| 5,155,847 | 10/1992 | Kirouac et al. | 395/200.09 |
| 5,166,886 | 11/1992 | Molnar et al. | 364/479.04 |
| 5,247,683 | 9/1993 | Holmes et al. | 395/712 |
| 5,267,171 | 11/1993 | Suzuki et al. | 364/479 |
| 5,361,358 | 11/1994 | Cox et al. | 395/712 |
| 5,367,686 | 11/1994 | Fisher et al. | 395/712 |
| 5,375,206 | 12/1994 | Hunter et al. | 395/712 |
| 5,408,608 | 4/1995 | Ryu et al. | 395/610 |
| 5,421,009 | 5/1995 | Platt | 395/712 |
| 5,473,772 | 12/1995 | Halliwell et al. | 395/712 |
| 5,481,714 | 1/1996 | Pipkin et al. | 395/712 |
| 5,497,455 | 3/1996 | Suga et al. | 395/159 |
| 5,553,143 | 9/1996 | Ross et al. | 380/25 |
| 5,579,222 | 11/1996 | Bains et al. | 395/712 |
| 5,588,146 | 12/1996 | Leroux | 395/601 |

FOREIGN PATENT DOCUMENTS 4-184553  7/1992  Japan .

OTHER PUBLICATIONS

"UNIX Network Programming", by W. Richard Stevens, Prentice–Hall Inc., pp. 34–35,1990.

Primary Examiner—James P. Trammell
Assistant Examiner—Tuan Q. Dam
Attorney, Agent, or Firm—Staas & Halsey

[57] ABSTRACT

Remote installation system and method for enabling a user to obtain any software through a communication line and automatically install it without taking a long time and requiring labor. A host computer transmits first and second key tables and to a terminal and a display displays keywords, included in these tables on a screen. The user selects keywords, which correspond to his target software, on the screen and the host computer sends a list of software, which corresponds to the keywords he selected, to the terminal. He selects his target software prom the list which is informed to the host computer. The host computer selects it from a software group and stores it on a hard disk of the terminal through a communication line, after checking its operation circumstances using a circumstance file. It is automatically registered in the system and its drive icon is displayed in a storage window. A sub-directory for a distribution destination is automatically created corresponding to the selected software thereby reducing the user's workload.

20 Claims, 14 Drawing Sheets

- ◎ SYSTEM REGISTRATION
- ○ ICON REGISTRATION OF INSTALLER
- ○ DOWN − LOAD

FIG. 6

```
RIS_SENDENV (TERMINAL → HOST)
  RID=1,
  MID=1,
  TIME=1994/08/94/12/20/20,
  MACHINE:
    MODEL=1,
    OS=1,
    DRV:
      DRVKIND=HS,
      HDINF:
        HDID=0,
        PARTINF:
          PARTNO=1,
          CAPACITY=400000,
          VACANT=200000,
          OSNAME=MSDOS2,
          DRVNAME=D,
          PRIORITY=?
        ;
        PARTINF:
          PARTNO=2,
          CAPACITY=500000,
          VACANT=300000,
          OSNAME=MSDOS,
          DRVNAME=E,
          PRIORITY=?
        ;
      ;
      DRVKIND=HS,
      HDINF:
        HDID=1,
        PARTINF:
          PARTNO=1,
          CAPACITY=500000,
          VACANT=200000,
          OSNAME=MSDOS,
          DRVNAME=F,
          PRIORITY=?
        ;
        PARTINF:
          PARTNO=2,
          CAPACITY=700000,
          VACANT=300000,
          OSNAME=MSDOS,
          DRVNAME=G,
          PRIORITY=?
        ;
      ;
      DRVKIND=F2,
      DRVKIND=F2,
      DRVKIND=C
    ;
    SOUKODIR=D:¥RIS¥SOUKO,    <-------- STORAGE DIRECTORY IS
    WINDIR=D:¥WINDOWS,                  APPOINTED HERE.
    MEM
      WMEM=8000000,
      TPA=400000
    ;
  ;
  MPSWD="1234"
~
```

FIG. 7

```
RIS_CHKENV*RESP (HOST ← TERMINAL)
  RID=6,
  JUDGE=1,
  STRPLACE:
    SOFT=5,
    WORKDIR="D:¥RIS¥SOUKO",
    SOUKODIR="D:¥RIS¥SOUKO¥FM"    <------PROVIDED WITH
  ;                                       SUB-DIRECTORY
  WORKSIZ=309000,
  SOUKOSIZ=549
```

FIG. 8

| | |
|---|---|
| (COMMAND) | RIS_KEYLIST |
| (RESPONSE) | RIS_KEYLIST*RESP<br>KEYLIST:<br>KEY=1,<br>NAME="OS/BASIC SOFTWARE"<br>KEY=2,<br>NAME="DEVELOPMENT SUPPORT"<br>KEY=3,<br>NAME="GAME"<br>~ |
| (COMMAND) | RIS_KEYLIST<br>KEY=3 |
| (RESPONSE) | RIS_KEYLIST*RESP<br>KEYLIST:<br>KEY=51,<br>NAME="RPG",<br>KEY=52,<br>NAME="ACTION"<br>KEY=53,<br>NAME="PUZZLE / QUIZ"<br>KEY=54,<br>NAME="SIMULATE"<br>KEY=55,<br>NAME="JOKE"<br>~ |
| (COMMAND) | RIS_LIST<br>KEY=52,<br>KEY=53 |

FIG. 9

```
RIS_SENDENV
  MACHINE:
    MODEL=1,(OBTAINED WHEN TERMINAL SOFTWARE IS INSTALLED)
    OS=1,
    DRV:
      DRVKIND="HS",
      HDINF:
        HDID="0",
        PARTINF:
          PARTNO="1",
          CAPACITY="50000000",
          VACANT="50000000",          (OBTAINED WHEN ACCESS IS
          OSNAME="MSDOS",              MADE TO HOST)
          DRVNAME="D",
          PRIORITY="1"
;;
```

FIG. 11

```
RIS_CHKENV
  SOFT=5  (WANTS TO CHECK SOFT CODE 5 )

RIS_CHKENV*RESP
  CHKEXE:
    TAG="VBRJP200.DLL"                    ( CHECKS WHETHER OR NOT FILE
    CMD="ST4 D:¥WINDOWS¥SYSTEM¥VBRJP200.DLL"   VBRJP200. DLL IS FOUND IN SYSTEM )
  ;
    WORKDIR="D:¥RIS¥KOBUTA"
    SOUKODIR="D:¥RIS¥KOBUTA"
  ;
  WORKSIZ=700000,
  SOUKOSIZ=500000

RIS_CHKENV
  SOFT=5,
  RESULT:
    TAG="VBRJP200.DLL",    (FILE VBRJP 200. DLL IS NOT FOUND IN SYSTEM
    VAL="OFF"                                                DIRECTORY )
  ;

RIS_CHKENV*RESP
  ASKCHECK:
    TAG="Q1",    ( QUERY IS MADE TO USER )
    QUERY=" VBRJP 200. DLL IS NEEDED TO EXECUTE THIS SOFTWARE, BUT
           IT CANNOT BE FOUND IN YOUR SYSTEM, EXECUTION IS
           IMPOSSIBLE UNDER THIS STATE, INSTALLATION IS APPROVED ?
    TYPE=0,
    ANS:
      CODE="OK",
      NAME="OK"
    ;
    ANS
      CODE="CANCEL",
      NAME="CANCEL"
    ;

RIS_CHKENV
  SOFT=5,
  RESULT:
    TAG="Q1",    ( USER ANSWERS THAT INSTALLATION IS APPROVED )
    VAL="OK"

RIS_CHKENV*RESP
  JUDGE="OK"    ( INSTALLATION IS POSSIBLE )

RIS_INSTALL
  CNT=1,
  TYPE="RIS",
  STRPLACE:
  SOFT=5,
  WORKDIR="D:¥RIS¥KOBUTA",
  SOUKODIR="D:¥RIS¥KOBUTA"
  ;
```

FIG. 12

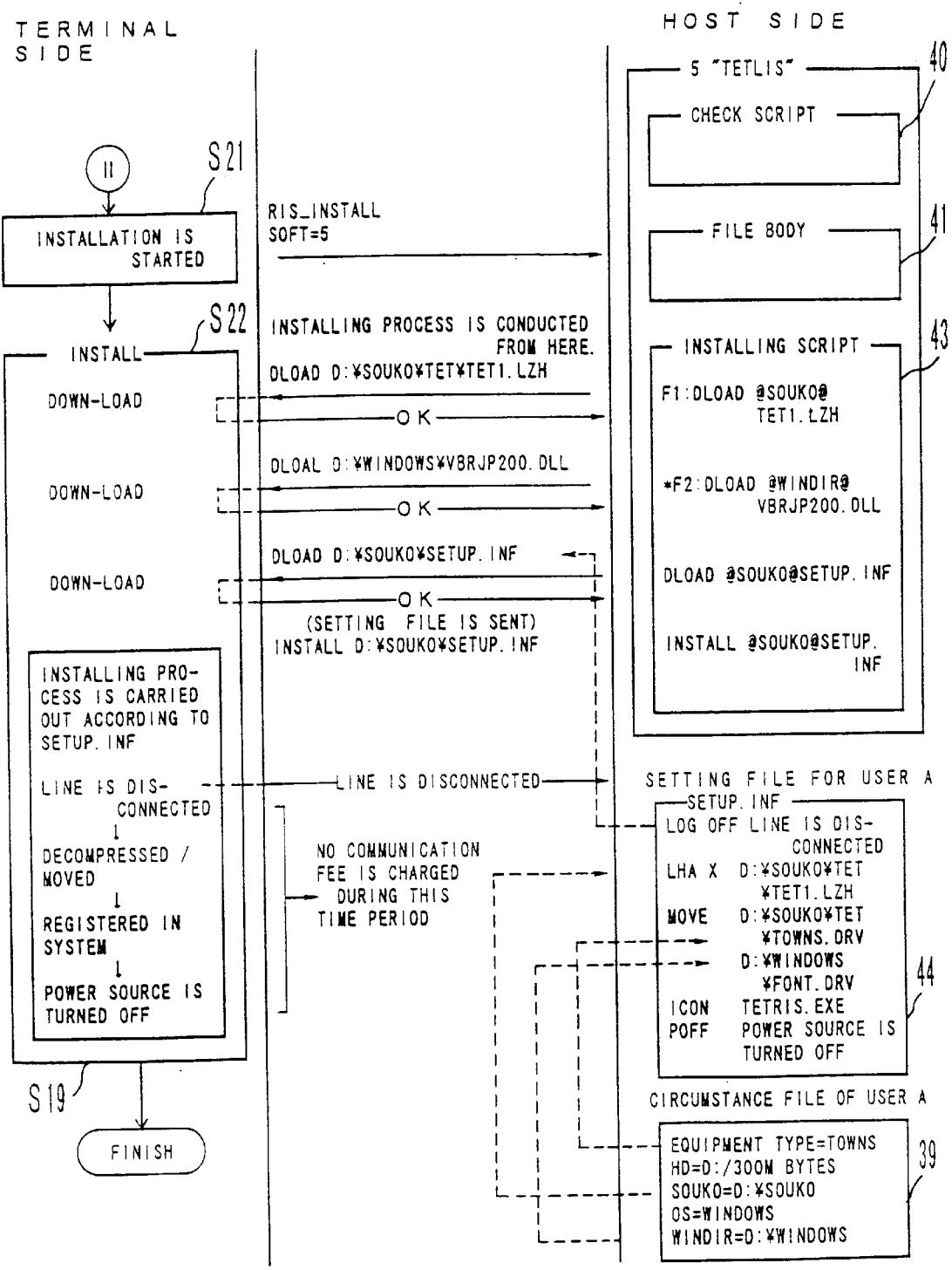
FIG. 1.3

```
[DstDirs]
 1=D:¥RIS¥KOBUTA
 2=D:¥WINDOWS¥SYSTEM

[Files]
;Description,            Dst(Dir:Name),   Shared
;----------------------------------------------------------------
;
Soft2.Exe,               1:Soft2.Exe,      N
TOWNS.DRV                2:FONT.DRV        N
```

F I G. 14

REMOTE INSTALLATION SYSTEM AND METHOD

BACKGROUND OF THE INVENTION

1. Field of the Invention

The present invention relates to a remote installation system and method for automatically installing any intended software into a terminal equipment of a user through a communication line.

2. Description of the Related Art

As personal computer communication becomes more and more popular, users have come to want to receive their intended or target software through a communication line. No system for enabling target software to be automatically distributed to user's homes in this manner, however, has yet been realized. To realize this, a system can be visualized whereby each user informs the distributing center of the target software through his terminal equipment, and the distributing center transmits his software to his terminal equipment through the communication line, in response to the request. Having received the target software, the user then appoints a directory in the terminal equipment at home and stores it. If necessary, he sets its corresponding icon.

To realize the above-mentioned software distribution, however, the following problems must be solved If directories, serving as windows through which software is distributed, are not standardized in users' terminal equipment, users themselves must subsequently conduct re-arrangement of their terminal equipment software by moving their files from one directory to another, and accordingly they cannot keep their software maintained well. In addition, they may feel it troublesome to appoint one or more directories for new software.

Further, a method by which they can select their target software from a large quantity of software through their terminal equipment has not yet been established. An additional system for enabling them to easily and correctly select their target software from among numerous software is needed.

Furthermore, the circumstance under which their target software can be made operative in their terminal equipment are usually plural, and users feel it troublesome to check these conditions one by one. Accordingly, once their target software has been obtained, it cannot be made operative in their terminal equipment at home if they have incorrectly checked the software operation circumstances.

In addition, the methods of installing the distributed target software are imagined to be usually plural, and their needs must therefore be taken into consideration.

Still further, software distributing and installing are demanded through a communication line. It is therefore important that the efficiency of the communication line used is not reduced.

SUMMARY OF THE INVENTION

An object of the present invention is therefore to provide a remote installation system and a method for enabling each user to obtain his target software through a communication line, and install it automatically in the terminal equipment as easily as possible.

The present invention relates to a remote installation system and a method for distributing software from a distributing center to the terminal equipment of each user, connected to the distributing center through a communication line.

The remote installation system includes an installing unit, a sub-directory appointing unit, a keyword storing unit, a circumstance checking unit, an automatic installing unit, a contents storing unit, an icon display unit, an installing menu display unit, a selecting unit, a keyword display unit, and a circumstance information informing unit.

The contents storing unit is arranged in the terminal equipment of each user and has a storing area which serves as a distributing destination used exclusively for a target software to be distributed.

The sub-directory appointing unit automatically appoints a sub-directory in the exclusive storing area, corresponding to the target software, after the target software to be distributed has been selected.

The installing unit distributes the target software to an area under the sub-directory which has been automatically created in the exclusive storing area.

The icon display unit displays an icon, which corresponds to the target software, in an exclusive window which corresponds to the exclusive storing area.

The keyword storing unit holds plural keywords related to plural software.

The keyword display unit displays those plural keywords, which are held by the keyword storing unit, duplicated in two or more hierarchies.

The selecting unit enables each user to select one or more keywords, which correspond to the target software, from those displayed by the keyword display unit, and inform the installing unit of them. The installing unit retrieves the target software from plural software, using the one or more keywords received.

The circumstance information informing unit obtains circumstance information relating to software operation circumstances in the terminal equipment and informs the distributing center of them.

The circumstance checking unit compares the circumstance information received from the circumstance information informing unit with that of the target software to check whether or not they are compatible, and informs the installing unit of the check result thus obtained. The installing unit decides whether or not the target software is to be distributed and if so, it determines a software distributing method, in response to the check result.

The installing menu display unit displays plural methods of installing the target software.

The selecting unit-enables each user to select a specific installing method from the plural installing methods displayed by the installing menu display unit and informs the installing unit of the specific installing method. The installing unit installs the target software in the contents storing unit according to the specific installing method selected.

The automatic installing unit automatically installs the target software in the contents storing unit, according to installing steps contained in a setting file received from the installing unit, which prepares the setting file for every user, re-writes the contents of the setting file, if necessary, and sends it to the automatic installing means.

The installing unit, sub-directory appointing unit, keyword storing unit and circumstance checking unit correspond to a host computer. The automatic installing unit, contents storing unit, icon display unit, installing menu display unit, selecting unit, keyword display unit, and circumstance information informing unit correspond to the terminal equipment in which the terminal software is installed. In particular, the contents storing unit corresponds to a hard disk, and the icon display unit, installing menu display unit and keyword display unit, correspond to a display device.

The exclusive storing area described above corresponds to an area under the "SOUKO" (or warehouse) directory on the hard disk, for example, and the exclusive window to a "SOUKO" window displayed on the screen of the display.

When the target software is to be distributed, the sub-directory appointing unit automatically appoints the sub-directory in the exclusive storing area of the contents storing unit. The sub-directory is automatically created in the exclusive storing area and the installing unit distributes the target software to the sub-directory thus created. The target software can be maintained well because the storing area used exclusively for it is provided. In addition, a user's workload can be reduced because the sub-directory is appointed and created automatically.

Further, the icon display unit displays an exclusive window which corresponds to the exclusive storing area and also automatically displays an icon which corresponds to the target software. The user can thus confirm that the target software has been distributed and can operate the target software at once, using the icon displayed.

Furthermore, the keyword display unit displays plural keywords, held by the keyword storing unit, possibly duplicated in two or more hierarchies, and the user selects some of these plural keywords using the selecting unit. The installing unit is informed of the keywords thus selected and the target software which corresponds to these keywords is retrieved. Keywords displayed are duplicated in displayed hierarchies, so the user can select keywords more flexibly and efficiently.

Still further, the circumstance checking unit compares the terminal software operation circumstances, which have been received from the circumstance information informing unit, with those of the target software, and checks whether or not they are compatible. If they are matched, for example, the installing unit distributes the target software to the terminal equipment, and if not, it asks the user whether or not the target software is Lo be distributed. Operation circumstances of the target software are checked before the software is distributed, so the checking work required by the user can be reduced.

Additionally, the installing menu display unit displays plural software installing methods in the form of a menu display and the user can select his desired specific installing method from the menu. The installing unit installs the target software in the exclusive storing area of the contents storing unit according to the installing method selected. Therefore, the user can try any of the installing methods previously prepared.

Still further, the automatic installing unit automatically installs the target software in the contents storing unit, in accordance with the installing steps contained in the setting file the installing unit prepares for every user. After receiving the setting file, the user need not communicate with the distributing center, so the efficiency of the communication line used can thus be increased. In addition, the contents of the setting file can be re-written by using the name of the above-mentioned sub-directory and circumstance information.

According to the present invention, the user's target software can be automatically installed from the distributing center to the terminal equipment through the communication line. When the present invention is employed, therefore, software can also be sold to each user through the communication line.

Each item of software distributed is stored in its exclusive directory, and can therefore be maintained well. In addition, the user need not input a string of characters, which appoint the directory and other information of the distributing destination, into the terminal equipment.

The user can more efficiently select the target software on the screen of the display and can also select its installing method. In addition, he need not check its operation circumstances because the circumstance check is made automatically.

Further, the use of the communication line can be reduced when the target software is installed.

BRIEF DESCRIPTION OF THE DRAWINGS

The present invention will become more apparent from the following detailed description, when taken in conjunction with the accompanying drawings, in which:

FIG. 6 shows an example of the installing method selecting window;

FIG. 7 shows an example (1) of the remote installing protocol;

FIG. 8 shows an example (2) of the remote installing protocol;

FIG. 9 shows a keyword selecting protocol;

FIG. 11 shows a circumstance information transmitting protocol;

FIG. 12 shows a circumstance checking protocol;

FIG. 13 is an operational flow chart showing an automatic installing process; and FIG. 14 shows an example of the setting file.

DETAILED DESCRIPTION OF THE PREFERRED EMBODIMENT

An embodiment of the present invention will be described in detail with reference to the accompanying drawings.

Figure 1:
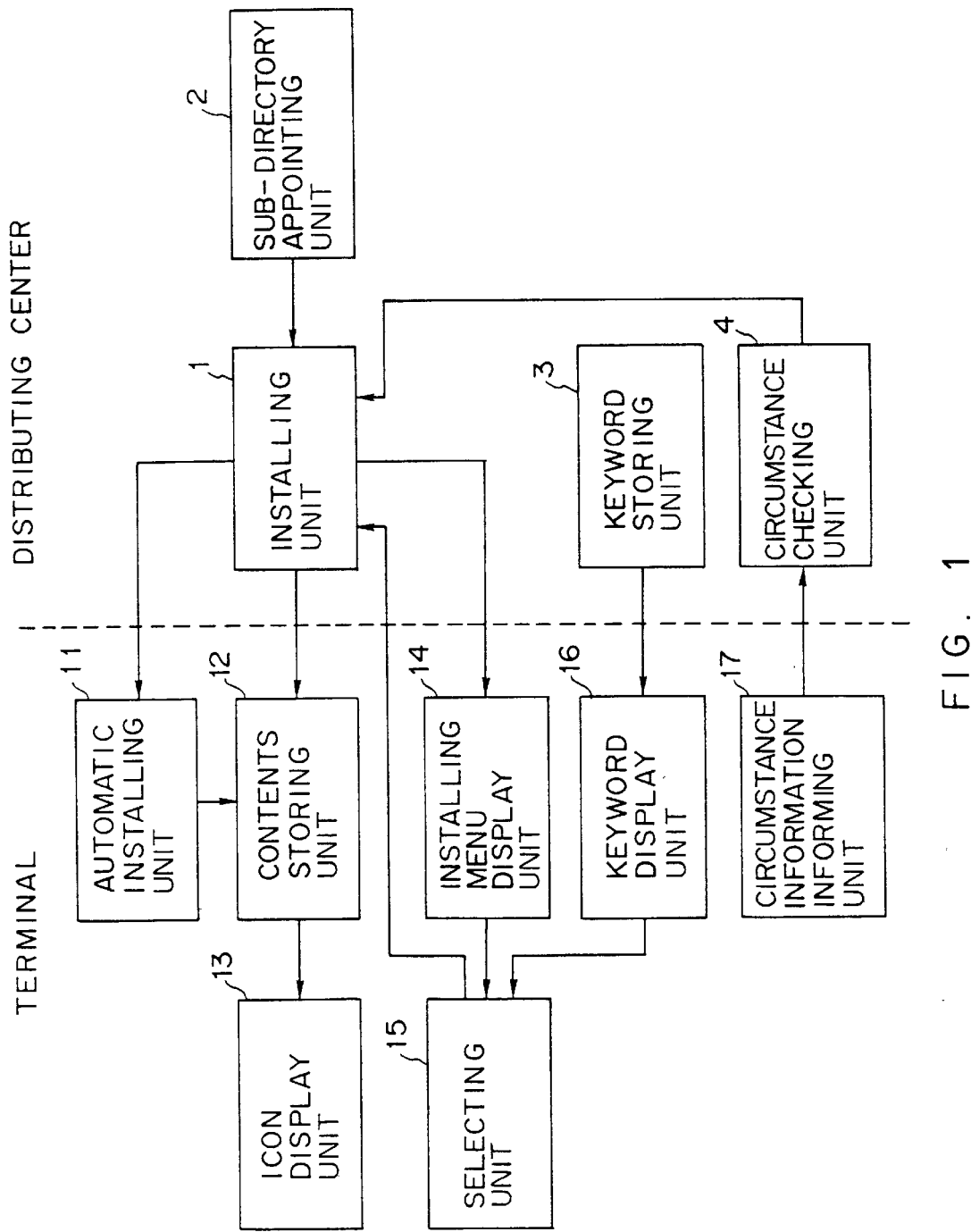
FIG. 1 is a block diagram showing the principle of the present invention.

FIG. 1 is a block diagram showing the principle of the present invention.

The present invention relates to a remote installation system and a method for distributing software from a distributing center to the terminal equipment of each user, connected to the distributing center through a communication line.

The remote installation system includes an installing unit 1, a sub-directory appointing unit 2, a keyword storing unit 3, a circumstance checking unit 4, an automatic installing unit 11, a contents storing unit 12, an icon display unit 13, an installing menu display unit 14, a selecting unit 15, a keyword display unit 16, and a circumstance information informing unit 17.

Figure 2:
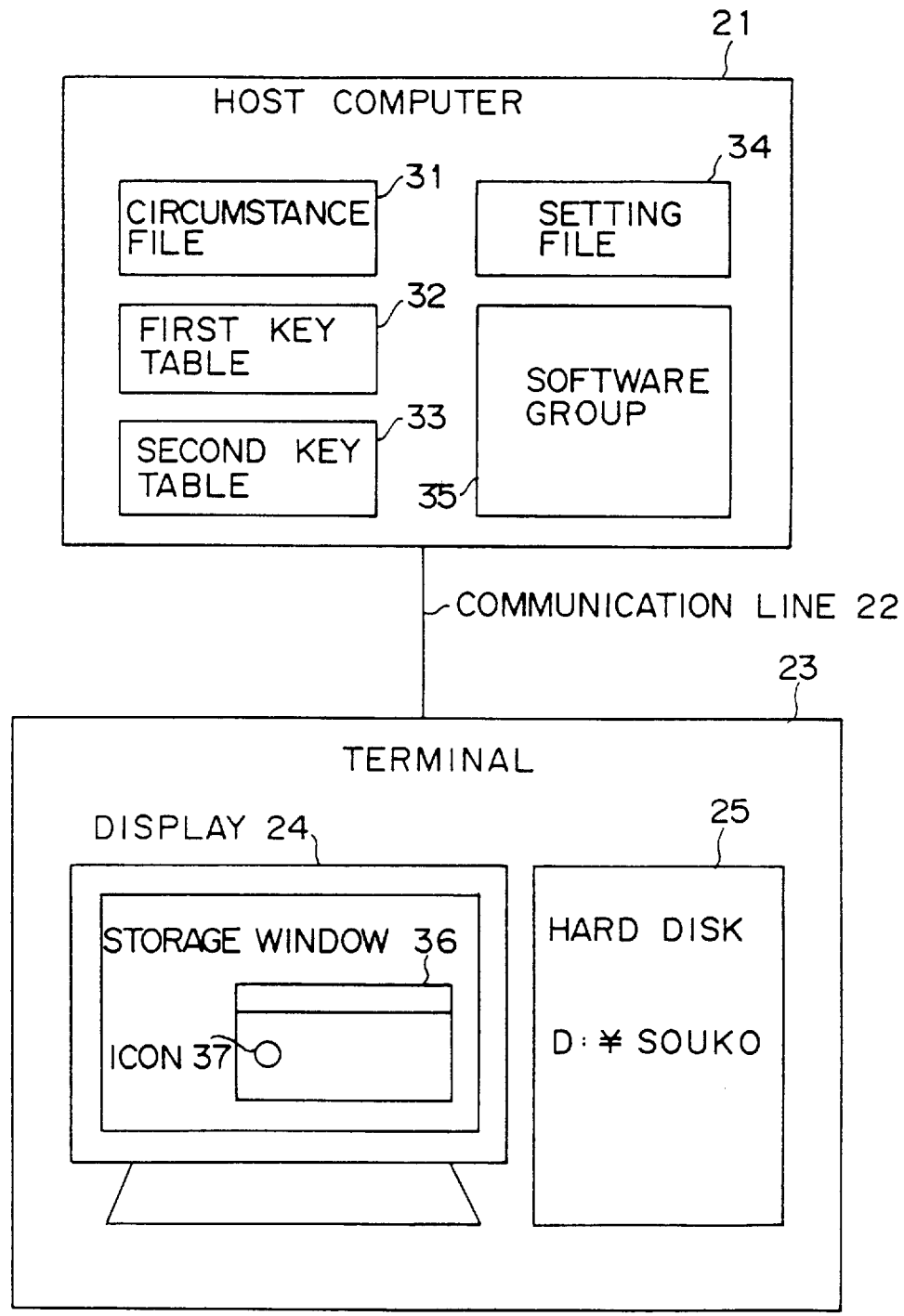
FIG. 2 is a block diagram showing an embodiment of the present invention.

FIG. 2 is a block diagram showing the remote installing system according to an embodiment of the present invention. The remote installing system, shown in FIG. 2, comprises a host computer 21 arranged at the software distributing center, a user's terminal equipment 23 and a communication line 22 for connecting them to each other. The terminal equipment 23 is a personal computer in a user's home remote from the software distributing center, and the communication line 22 is intended for the personal computer communication network.

The host computer 21 stores a group of software 35 including plural software capable of being distributed to a storing area of the terminal equipment 23, first key table 32, and second key table 33 for holding lists of keywords which are used to select a specific item of software from the software group 35.

When the user inquires of the host computer 21 for the keyword lists through the terminal 23, the host computer 21 transmits' the first and second key tables 32 and 33 successively and displays keywords included in them on the display 24 of his terminal 23. The user selects the displayed keywords which corresponds to the target software and informs the host computer 21 of his selection.

The host computer 21 displays on the user's display 24 a menu including titles of software which correspond to the keyword used, and the user selects the target software from the menu displayed and informs the host computer 21 of his selection The host computer 21 picks up contents (or file) of the user target software from the software group 35 and stores it in a directory D:¥SOUKO which has been set for distribution (or home distribution) on the hard disk 25 of the terminal 23.

An icon 37, which makes the home-distributed software operative, is then automatically registered and displayed in the storage window 36 on his display 24 which has been set corresponding to the directory D:¥SOUKO. When the terminal 23 includes the WINDOWS Operating System, for example, the home-distributed software is registered in the program manager. Thereafter, he can use the home-distributed software simply by selecting the icon 37 using an input device such as a mouse.

A circumstance file 31, including circumstances under which tools such as the hardware and software of the terminal 23 are operated, is created in the terminal 23 and sent to the host computer 21 when the user gains access to the host computer 21. The host computer 21 holds the received circumstance file 31 for every user and uses it to check whether or not the software selected by the user can be operated in the terminal 23.

Further, the host computer 21 prepares a setting file 34 for every user and writes there a set of files needed to operate the software selected by the user, together with a storing position at which the file set is stored. While sending the setting file 34 to the terminal 23 along with the file set, the host computer 21 enables the terminal 23 to install the software automatically.

Figure 3:
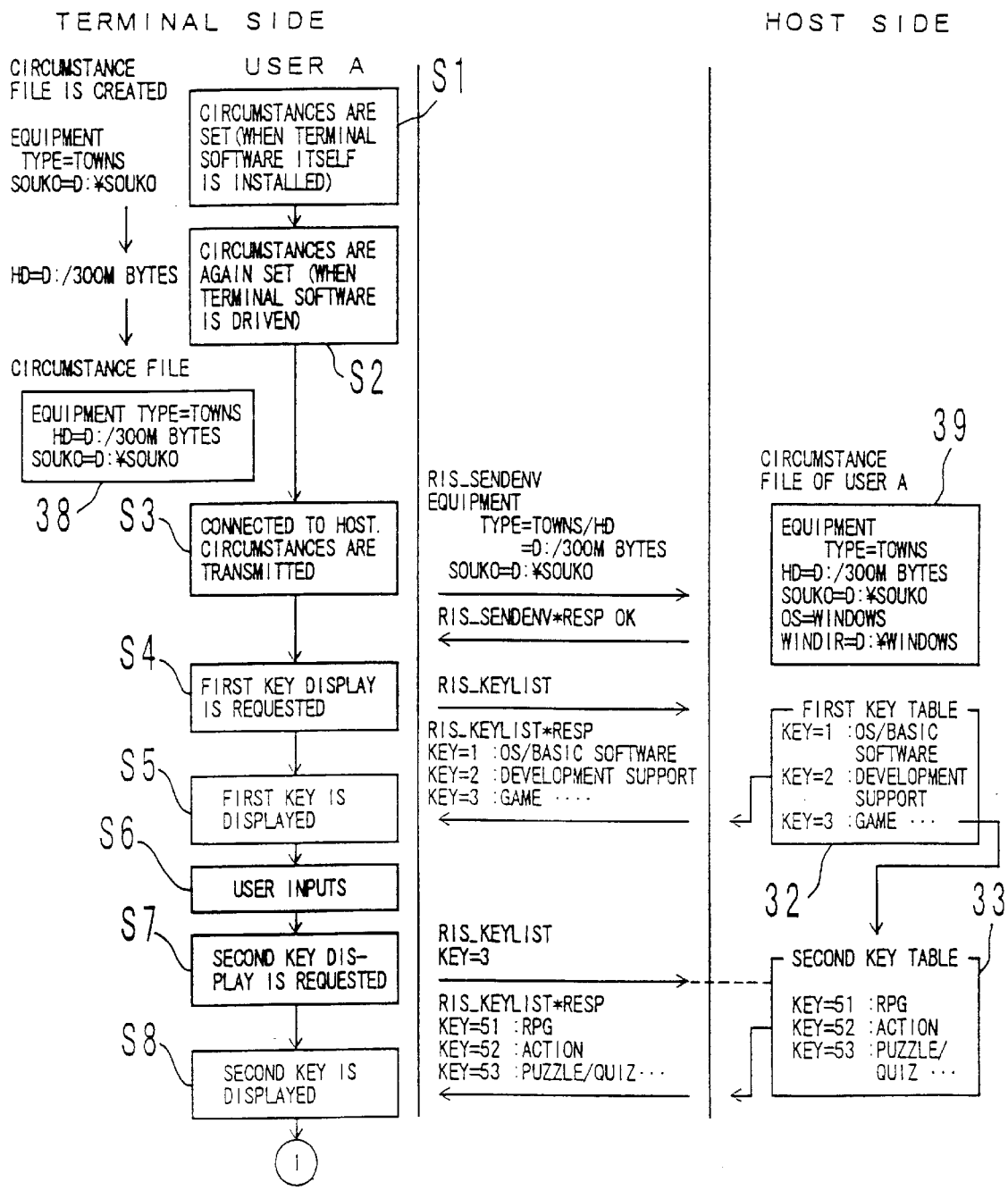
FIG. 3 is an operational flow chart (1) showing a remote installing process.
Figure 4:
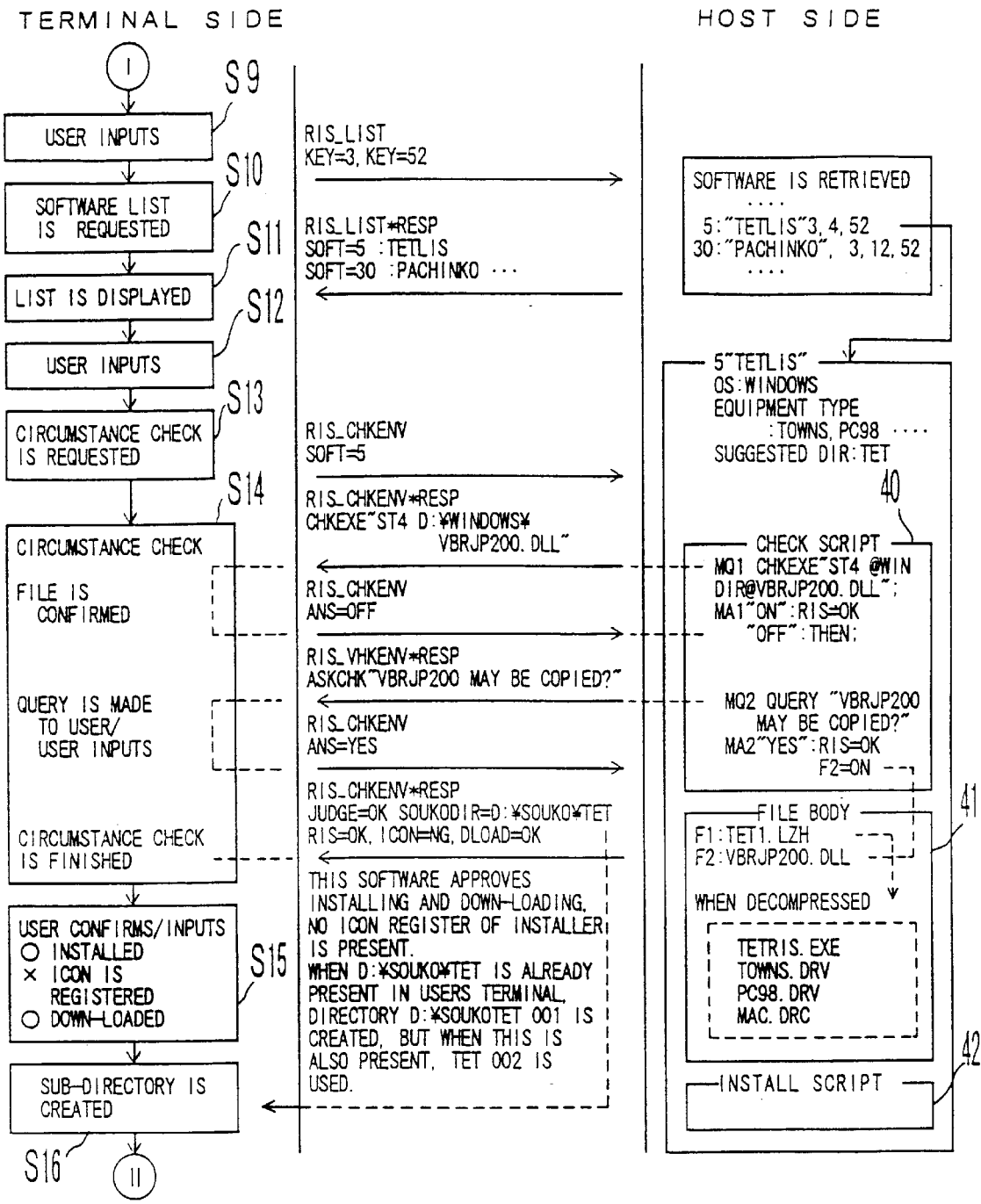
FIG. 4 is an operational flow chart (2) showing the remote installing process.
Figure 5:
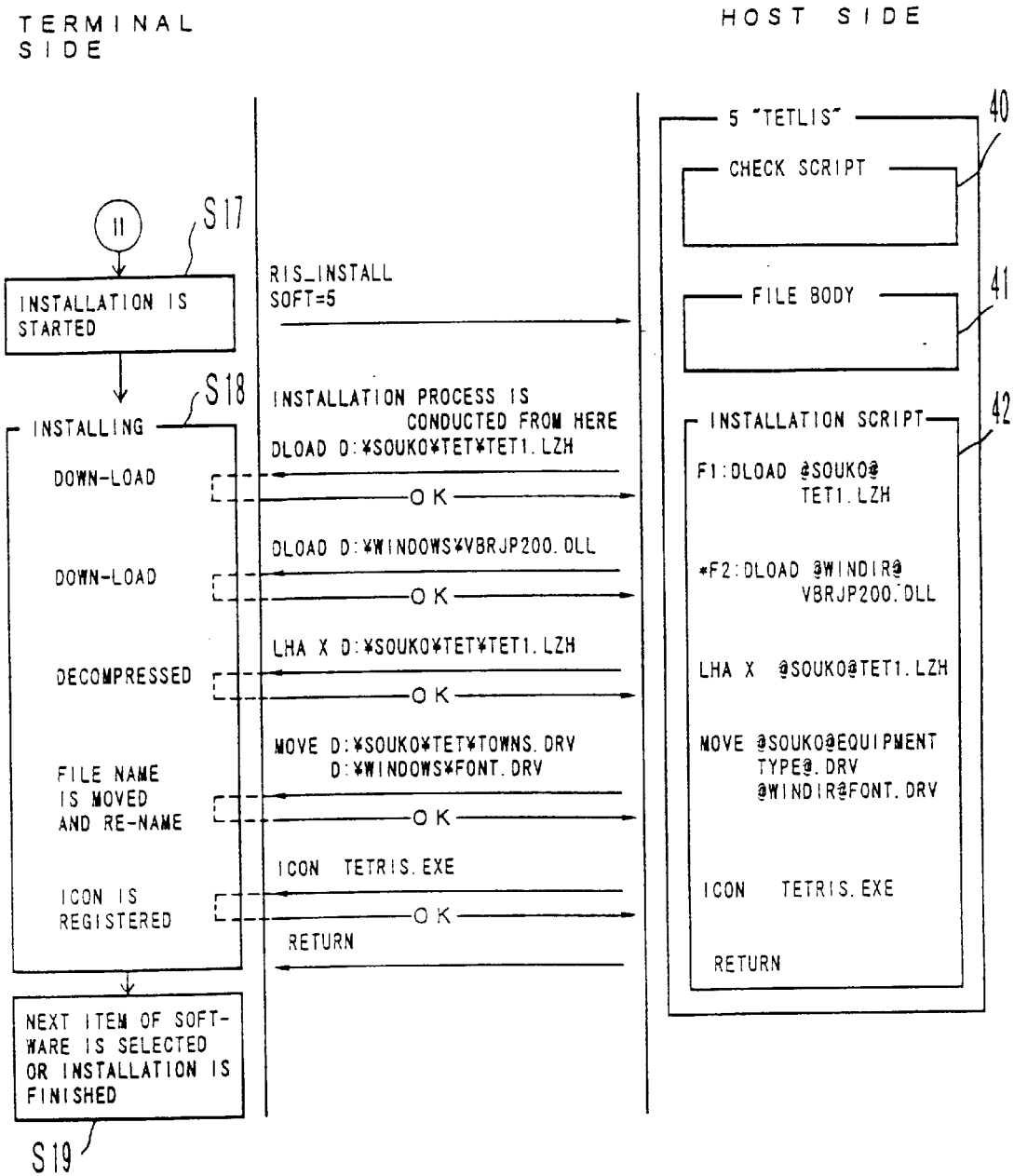
FIG. 5 is an operational flow chart (3) showing the remote installing process.

Referring to FIGS. 3 through 5, it will be described how the home distribution of software is conducted by the remote installing system shown in FIG. 2.

In FIG. 3, the terminal 23 of a user A obtains information of operation circumstances when a communication terminal software is installed, and creates a circumstance file 38 which sets the information thus obtained in it (step S1). Information which takes a long time to obtain, such as the type of the user's terminal and the storing position SOUKO used for the home distribution, or information which must be asked of the user, if necessary, is obtained at this time.

Upon determining the storing position SOUKO, the terminal 23 checks whether or not the hard disk 25 has a free or empty area larger than a predetermined capacity, and when it has such a free area, the terminal 23 creates there a home distribution directory. The terminal 23 then creates the title of directory and other information automatically, and the user A only has to confirm it. Therefore, the user need not input the directory title or other information into the terminal 23.

It is written in the circumstance file 38 in this case that the type of the user's terminal 23 is TOWNS and that the SOUKO directory is D:¥SOUKO (or directory SOUKO on drive D). The user A can change D:¥SOUKO to another directory name, if necessary.

When no free area of the predetermined capacity is found in the partition selected, another partition, in which the free area is largest, is searched for and the home distribution directory is created there. When the directory D:¥SOUKO becomes full, the terminal 23 displays on the screen of the display 24 a message, for example, "D:¥SOUKO is full. Storage is changed to F:¥SOUKO OK?". When the user A approves this, F:¥SOUKO becomes the new directory. When no free area of the a predetermined capacity is found in any part of the hard disk, a message "Unfortunately the disk capacity is insufficient. Please add a new disk.", for example, is displayed.

When the terminal software is made operative (or access is gained to the host computer 21), information which may be changed after installation, such as the state of hard disk and memory, is then obtained (step S2). This information is written in the circumstance file 38 in the case that the hard disk of the user A is set to be drive D and that its free capacity is 300M bytes. The contents of the circumstance file 38 thus created are transmitted to the host computer 21, in response to a command RIS_SENDENV, when the user A accesses the host computer 21 (step S3).

The host computer 21 holds the information received as a circumstance file 39 of the user A. The user A circumstance file 39 includes the OS (operating system) used and its stored position, in addition to the type of the terminal, hard disk information (HD) and storing position SOUKO. It is understood here that the OS of the terminal 23 of the user A is WINDOWS and that its stored position WINDIR is D:¥WINDOWS.

When it receives from the host computer 21 RIS_SENDENV*RESP OK, which is a response to the command RIS_SENDENV, the terminal 23 asks the host computer 21 for the first key list by a command RIS_KEYLIST (step S4). In response to this command, the host computer 21 sends back the contents of the first key table 32 together with RIS_KEYLIST*RESP to the terminal 23 The first key table 32 stores, in this case, "OS/basic software", "development support", "games", . . . as keywords corresponding to key numbers 1, 2, 3, . . . .

When these, keywords are displayed as the first key list on the screen of the display 24 (step S5), the user A selects the first of the keywords and inputs keywords into the terminal 23 (step S6). The terminal 23 thus sends the key number of the first keyword, which has been selected by the user A, along with the command RIS_KEYLIST, which requests the host computer 21 for the second key list, (step S7). The user A selects "games" as the first keyword and the key number 3, which corresponds to "games", is sent to the host computer 21.

The host computer 21, which is asked to send the second key list, searches the second key table 33 by using a pointer stored in the first key table 32, in response to the key number received, and sends back the contents of the second key table 33 together with RIS_KEYLIST*RESP to the terminal 23. The second key table 33 stores, in this case "RPG", "action", "puzzle/quiz", . . . as keywords corresponding to key numbers 51, 52, 53, . . .

Plural second key tables are usually prepared corresponding to keywords in the first key table, and its number of keywords is the same as, or smaller than, that of keywords in the first key table 32. When it is smaller, two or more keywords in the first key table 32 correspond to a same second key table.

When keywords in the second key table are displayed as the second key list on the screen of the display 24 (step 58), the user A selects the second keyword from them and inputs keywords into the terminal 23 (FIG. 4, step S9). The terminal 23 thus sends the key numbers of the first and second keywords, which have been selected by the user A, together with the command RIS_LIST, which asks the host computer 21 for a list of software corresponding to both of the first and second keywords, (step S10). The user A selects "action" as the second keyword and the key number 52 which corresponds to "action" is sent to the host computer 21, in this case.

The host computer 21, which is asked to send the list of software, retrieves software which has the two key numbers of the first and second keyword, from the software group 35. Flat retrieval is carried out at this time without distinguishing the first keyword from the second one. Further, the types of terminal and OS are dealt with as default keys, and the retrieval is carried out taking this into consideration. This prevents software, which is not used exclusively for TOWNS but for other types of terminals, from being retrieved.

The list, including titles and numbers of software, thus retrieved is sent together with RIS_LIST*RESP to the terminal 23. Software representing "tetlis" and "pachinko", for example, which have key numbers 3 and 52, correspond to those retrieved. These titles are therefore sent along with their software numbers 5 and 30 to the terminal 23.

When the list of software is displayed on the screen of the display 24 (step S11), the user A selects his intended software from the list and inputs it into the terminal 23 (step S12). The terminal 23 thus sends the key number of the software, which has been selected by the user A, together with a command RIS_CHKENV, which asks the host computer 21 to check whether or not circumstances of the user A are suitable for the operation of the software selected, to the host computer 21 (step S13). The user A selects "tetlis" in this case, and the software number 5, which corresponds to "tetlis" is therefore sent to the host computer 21.

The host computer 21, which has received the software number selected, prepares a check script 40 to check whether or not operation circumstances of the software corresponding to the number selected match those of the user's terminal 23, and then checks their operation circumstances. This check is automatically carried out by interacting information between an execution program of the check script 40 and a terminal software of the terminal 23. Therefore, the user A is not necessarily aware that the circumstance check is being carried out (step S14). Only when it becomes necessary will the host computer 21 ask questions of the user A.

The operation circumstances of "tetlis", selected by the user A, are that the OS is WINDOWS, that the kind of equipment is TOWNS, PC98 and so on, and that the title of the suggested directory (DIR) is TET. The user's circumstance file 39 says that the kind of equipment is TOWNS and that OS is WINDOWS. When both of them are compared, it can be understood that they are the same in OS and the type of equipment.

When the check script 40 of "tetlis" is viewed, a command "ST4 @WINDIR@VBRJP200.DLL" which asks to check whether or not a file "VBRJP200.DLL" is present in the storing position WINDIR of the user's side, is found in the check script (MQ1). Therefore, the host computer 21 sends this command, together with RIS_CHKENV*RESP to the terminal 23. Referring to the user circumstance file 39 this time, the host computer 21 replaces @WINDIR@ by D:¥WINDOWS and sends it to the terminal 23. The symbol @ represents a wild card, and the file "VBRJP200.DLL" is one of files needed to make "tetlis" operative.

When it receives the command, the terminal 23 checks whether or not the file "VBRJP200.DLL" is found in the directory WINDOWS of drive D, and sends back its result as ANS to the host computer 21. ANS=OFF is sent back in this case because the file is not found.

The host computer 21, which has found that the file "VBRJP200.DLL" is not present in the terminal 23, sends a request "May VBRJP200 be copied?" to the terminal 23, following the check script 40 (MQ2), and this is displayed on the screen of the display 24.

The user A inputs the answer into the terminal 23, which sends it back to the host computer 21. ANS=YES is sent back in this case and the host computer 21 approves the remote installation (RIS=OK) and makes a flag F2 ON (MA2), which requests the copying of "VBRJP200.DLL", following the check script 40.

If the file "VBRJP200.DLL" is present in the suggested directory of the terminal 23, ANS=ON is sent back to the host computer 21. Therefore, RIS=OK is established at this time (MA1).

When a circumstance check is carried out in this manner, distribution to the terminal 23 of software unsuitable for the circumstances of the user A can be prevented. The following case, for example, can be prevented: After some package of software is bought through the communication line 22, it is found that the software cannot be made operative because a specific driver is not installed.

When RIS=OK, the host computer 21 finishes the circumstance check and sends its result (JUDGE=OK) along with a directory SOUKODIR of the software-distributed destination, to the terminal 23. This SOUKODIR is appointed in such a form that TET, which is the suggested directory of "tetlis", is added as a sub-directory below D:¥SOUKO, which is the directory of SOUKO stored in the user's circumstance file.

At the same time, it is sent to the terminal 23 whether or not the installation can be made (RIS), whether or not the installing program (or installer) is icon-registered (ICON), and whether or not down-load can be made (DLOAD) Using these flags RIS, ICON and DLOAD, the host computer 21 tells the terminal 23 which of the installation, the icon-registration of installer, or the down-load, can be made.

The installation means that the software selected by the user A is registered in the system of the terminal 23 or in WINDOWS, for example, to enable it to be used on the terminal 23. Therefore, it includes, in this case, even a process ending with icon-registration for an execution file of the software in WINDOWS. On the other hand, the icon-register of installer means that a program for executing the installation is icon-registration in the terminal 23.

There are presented here those conditions that the installation and the down-load are approved (RIS=OK, DLOAD=

OK), but where the icon-registration of installer is not carried out (ICON=NG). When the software has a complicated installation program, it is shown that the icon-registration of installer is needed, instead of approving the installation. When an application for TOS (or the OS of TOWNS) is asked from the WINDOWS-mounted terminal, only the down-load is approved.

The terminal software of the terminal 23 gives priority to each of the installation, the icon-register of installer, and the down load in the highest to lowest priority order, sets as default the one having the highest priority, and displays it on the screen of the display 24. The installation having a higher priority than the installation and the down-load, which have been approved by the host computer 21, is set here as the default and displayed on an installing method selecting window.

FIG. 6 shows an example displayed on the installing method selecting window. In FIG. 6, "system registration" corresponds to the installation and is selected as the default.

The user A confirms the installing method displayed and inputs into the terminal 23 that he confirms the method (step S15). He can also change the settings displayed. When he wants to do the icon-registration of installer, for example, he selects "icon-registration of installer" in the installing method selecting window shown in FIG. 6, and inputs this into the terminal 23.

Fundamentally, the user A selects "system registration" when he wants to make the installation without requiring any time and labor, "icon-registration of installer" when he wants to do various installation settings by his own hands, and "down-load" when he wants to change the storing position later (or to make the installation into a terminal of a different type). When "down-load" is selected, the user can test whether or not a software for a type of terminal different from that of the terminal 23 is made operative.

The terminal 23 then automatically creates a home-distributing sub-directory D:¥SOUKO¥TET, as instructed by the host computer 21, on its hard disk 25 (step S16) If the sub-directory D:¥SOUKO¥TET already exists in the terminal 23, a sub-directory D:¥SOUKO¥TET 001, for example, is created, and when this also already exists, a sub-directory D:¥SOURO¥TET 002 is created.

A file body 41 of "tetlis" comprises files TET1-LZH (F1) and VBRJP200.DLL (F2), and TET1.LZH is a compression of four files TETRIS.EXE, TOWNS.DRV, PC98.DRV and MAC.DRC. When TET1.LZH is decompressed, it splits into these four files. This decompression of TET1.LZH is carried out after it is distributed from the host computer 21 to the terminal 23.

The terminal 23, which has created the home-distributing sub-directory, sends it together with the key number of an item of software, which selects a command RIS_INSTALL for the start of remote installation, to the host computer 21 (FIG. 5, step S17). In response to this, the host computer 21 starts the remote installation of software which corresponds to the key number received. This remote installation is automatically carried out, following an installing script 42 of "tetlis" created by the host computer 21 and exchanging information between the host computer 21 and the terminal 23 (step S18).

The installing script 42 instructs that the file TET1.LZH is down-loaded to the storing position @SOUKO@ on the user's side. Therefore, the host computer 21 replaces @SOUKO@ by SOUKODIR=D:¥SOUKO¥TET and down-loads TET1.LZH to the sub-directory D:¥SOUKO¥TET on the hard disk 25.

When it is informed by the terminal 23 that the down-load is finished (OK), the host computer 21 then replaces @WINDIR@ by D:¥WINDOWS and down-loads VBRJP200.DLL to the directory D:¥WINDOWS of the hard disk 25.

When it is informed from the terminal 23 that the down-load is finished (OK), the host computer 21 then sends LHA X D:¥SOUKO¥TET¥TET1.LZH, which requests decompression of the file TET1.LZH down-loaded to the storing position @SOUKO@ (D:¥SOUKO¥TET), to the terminal 23. In response to this, the terminal 23 decompresses file TET1.LZH to the above-mentioned four files TETRIS.EXE, TOWNS.DRV, PC98.DRV and MAC.DRC. These four files are stored in the sub-directory D:¥SOUKO¥TET in which the TET1.LZH is also stored.

When it is informed by the terminal 23 that the decompression is finished (OK), the host computer 21 sends an instruction MOVE D:¥SOUKO¥TET¥TOWNS.DRV D:¥WINDOWS¥FONT.DRV, which requests moving of a file having an equipment type @.DRV in the storing position @SOUKO@ (D:¥SOUKO¥TET) to the storing position @WINDIR@ (D:¥WINDOWS), and to change the title of the file, to the terminal 23. Referring to the user's circumstance file 39, the host computer 21 replaces the equipment type@ with TOWNS and sends it to the terminal 23 at this time. In response to this, the terminal 23 moves the file TOWNS-DRV from the sub-directory D:¥SOUKO¥TET to the directory D:¥WINDOWS (file move) and changes the file name to FONT.DRV (rename).

When it is informed by the terminal 23 that the file moving and renaming is finished (OK), the host computer 21 sends an instruction ICON TETRIS.EXE, which requests the icon-registration of a file TETRIS.EXE, to the terminal 23. In response to this, the terminal 23 changes the file TETRIS.EXE of the sub-directory D:¥SOUKO¥TET into an icon and registers the icon in the terminal 23, The icon 37 which makes the TETRIS.EXE operative is thus displayed in the storage window 36 on the screen of the display 24, and when it is selected, "tetlis" starts operation When it is informed by the terminal 23 that the icon-registration is finished (OK), the host computer 21 sends RETURN back to the terminal 23 and informs the terminal 23 of the completion of the remote installation process. A series of installing steps is thus finished. The terminal 23, which has been informed of the conclusion of the remote installation process, selects the next software and remote installation, following the instructions executes of the user A, or it finishes the process (step S19).

When the software installed at step S1B has a capacity larger than the free capacity of the storing position to which the software is down-loaded, the storing position is changed and the software is then down-loaded.

Referring to FIGS. 7 through 12, examples of the remote-installing protocol and display examples of the first and second keywords are described.

FIG. 7 shows an example of the protocol of sending circumstance information through the terminal 23 when the terminal 23 gains access to the host computer 21 at the step S3. In the protocol shown in FIG. 7, request ID (RID), machine ID (MID) for specifying the terminal, time; (TIME) and machine information (MACHINE:) relating to the terminal are included.

Information, such as capacity and drive name relating to the hard disk 25, is included in drive information (DRV:) in the MACHINE:. CAPACITY in PARTINF:, for example, represents the capacity of a partition, VACANT the free capacity of the partition, and DRVNAME represents the drive name corresponding to the position.

Following the DRV:, storage directory SOUKODIR, which is a storing position for home distribution and directory WINDIR which is a storing position of the OS (WINDOWS), are included. SOUKODIR= D:¥RIS¥SOUKO and WINDIR=D:¥WINDOWS are applied in this case. Information (MEM:) relating to the memory is then included. The terminal 23 informs the host computer 21 of the home-distributing destination by appointing the SOUKODIR.

Following the MACHINE:, machine password (MPSWD) of the terminal 23 and others are included.

FIG. 8 shows an example of the protocol of adding a sub-directory to SOUKODIR and sending it back to the terminal through the host computer 21 when the circumstance check is finished at the step S14. In the protocol shown in FIG. 8, RID, circumstance checking result (JUDGE), and information (STRPLACE:) relating to the home-distributing destination, are included.

In the STRPLACE:, SOFT represents the key number of an item of software selected by the user at the step S12, WORKDIR a working area, and SOUKODIR a home-distributing destination appointed by the host computer 21. The WORKDIR is the same as SOUKODIR in FIG. 7 and SOUKODIR has such a form that a sub-directory name FM is added to SOUKODIR in FIG. 7, in this case.

Following the STRPLACE:, size WORKSIZ of the working area and size SOUKODIR of the home-distributing destination are included.

FIG. 9 shows an example of the protocol in which the host computer 21 sends the first and second key lists to the terminal 23 while the terminal 23 sends back key numbers of keywords selected by the user A to the host computer 21 at the steps S4–S9. When the terminal 23 asks the host computer 21 for the first key list by the command RIS__KEYLIST in the protocol shown in FIG. 9, the host computer 21 sends back the contents KEYLIST: of the first key table, together with RIS__KEYLIST*RESP, to the terminal 23, in response to the terminal 23. In this KEYLIST:, keyword NAME="OS/basic software", "development support", "game", . . . corresponding to key numbers KEY= 1, 2, 3, . . . are included.

When the terminal 23 sends the key number 3 of the first keyword "game" selected by the user A together with RIS__KEYLIST to the host computer 21, the host computer 21 sends back the contents KEYLIST: of the second key table which corresponds to the key number 3, together with RIS__KEYLIST*RESP to the terminal 23. In this KEYLIST:, keyword NAME="RPG", "action", "puzzle/quiz", "simulate", "joke", . . . corresponding to key numbers KEY=51, 52, 53, 54, 55, . . . are included.

The terminal 23 sends key numbers 52 and 55 of the second keyword "action" and "joke" selected by the user A, together with RIS__LIST, to the host computer 21, and requests the list of software having the three key numbers 3, 52 and 55. The key number 3 of the first keyword already sent is stored in the host computer 21 in this case, so only the key numbers 52 and 55 of the second keywords are sent to the host computer 21.

Figure 10:
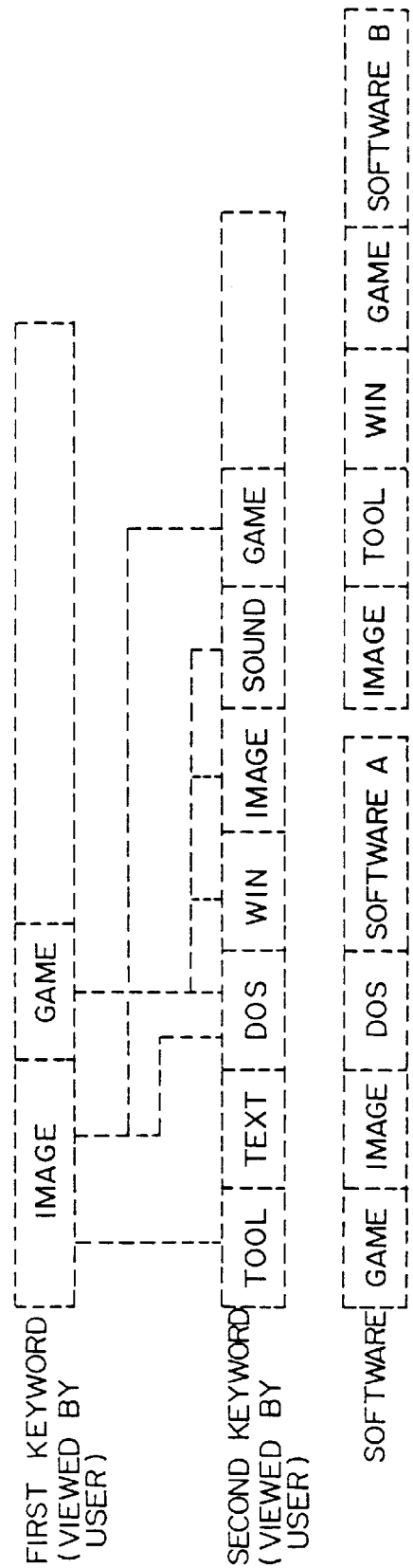
FIG. 10 shows an example of keywords displayed.

FIG. 10 shows an example of first and second keywords displayed. First and second keywords are different from those shown in FIG. 9. The first keywords such as "image" and "game", for example, are displayed on the screen of the display 24 that the user A is viewing, and when he selects a first keyword, the second keywords such as "tool", "text", "DOS", "WIN", "image", "sound" and "game" are then displayed. The second keywords include "image" and "game" which are the same as those of the first keyword.

The user A can select any of keywords displayed. He can select "image" as the first keyword and "tool", "DOS" and "game" as the second keywords, for example, or can select "game" as the first keyword and "DOS", "WIN", "image", and "sound" as the second keywords. Or he can select two or more keywords as the second keywords at the same time.

Usually, there are many keywords for selecting intended software from the software group 35, so the user A feels it difficult to distinguish them visually when all of them are displayed at once, especially when those which are not needed at all are displayed. When they are displayed as a simple tree structure, the keyword which is selected first plays an important role. If an incorrect selection is made, therefore, his intended software cannot be obtained.

When keywords are displayed in two hierarchies and when some of them are duplicated in these two hierarchies as shown in FIG. 10, however, the user can more flexibly select the required one from many keywords. Additionally, they may be displayed in two or more hierarchies.

The contents of each software in the software group 35 are stored, having been previously related to some of the keywords. In FIG. 10, for example, a software A has three keywords such as "game", "image" and "DOS", while software B four keywords such as "image", "tool", "WIN", and "game". When the user A selects two keywords such as "image" and "game", therefore, a list including these two items of software is sent from the host computer 21 and displayed on the screen of the display 24.

FIG. 11 shows another example of the protocol of sending circumstance information from the terminal 23 to the host computer 21, when access is gained to the host computer 21, at step S3. In the protocol shown in FIG. 11, MODEL in machine information MACHINE: is information obtained when the terminal software is installed at step S1 and represents the terminal type TOWNS. The VACANT in PARTINF: is information obtained (at step S2) before access is gained to the host computer 21 at the step S3, and represents the free capacity of a target partition.

FIG. 12 shows an example of protocol in which a circumstance check is made at the step S14 and the installation is then started at the step 517. In the protocol shown in FIG. 12, the terminal 23 sends the number (soft code) SOFT=5 of a software selected by the user A, together with the command RIS__CHKENV, to the host computer 21, and requests a circumstance check.

The host computer 21 sends the instruction CHKEXE:, which asks to check whether or not the file VBRJP200.DLL is found in the system directory of the terminal 23, together with the response RIS__CHKENV*RESP, to the terminal 23. CHKEXE: includes TAG="VBRJP200.DLL", command CMD="ST4 D:¥WINDOWS¥SYSTEM¥VBRJP200.DLL", working directory instruction WORKDIR= "D:¥RIS¥KOBUTA" and home-distributing destination directory instruction SOUKODIR="D:¥RIS¥KOBUTA.

The terminal 23 checks whether or not the file VBRJP200.DLL is found in the directory WINDOWS__SYSTEM of the drive D, and sends its result, as RESULT:, to the host computer 21. The RESULT: includes the check result VAL="OFF" together with its corresponding TAG= "VBRJP200.DLL". This means that the file VBRJP200.DLL is not found in the system directory.

The host computer 21, therefore, sends an instruction ASKCHK:, which asks whether or not the software selected may be installed, together with the response RIS_CHKENV*RESP, to the terminal 23 ASKCHK: includes TAG="Q1", a displayed question QUERY=". . . installation is approved?", and the answer format ANS:.

The terminal 23 sends back the answer input by the user, as RESULT:, together with the command RIS_CHKENV, to the host computer 21. The RESULT: includes the answer result VAL="OK" together with its corresponding TAG="Q1". This means that the software may be installed.

If no other problem is found relating to the operation circumstances, therefore, the host computer 21 sends the circumstance check result JUDGE="OK", together with the response RIS_CHKENV*RESP, to the terminal 23. This means that the operation circumstances are suitable for the software having soft code 5 and that the software can be thus installed, even though the file VBRJP200.DLL is not found.

Now the circumstance check result is "OK", so the terminal 23 sends the installing type TYPE="RIS", the home-distributing destination instruction STRPLACE: and other information, together with a command RIS_INSTALL, to the host computer 21, and requests the installation. The STRPLACE: includes the soft code SOFT of the software to be installed, the working directory WORKDIR and home-distributing destination directory SOUKODIR.

Thereafter, the host computer 21 installs the software according to the manner instructed. Upon installing the software, the terminal 23 decompresses the file, copies it and registers it in the system, in response to the command supplied from the host computer 21, as described at step S18 shown in FIG. 5, for example. The terminal 23 sends a response to the host computer 21 each time such decompressing, copying and registration works is finished. Therefore, the host computer 21 can monitor the software installing process to completion.

According to this method, however, communication must be quite frequently made between the terminal 23 and the host computer 21, so the efficiency of communication becomes low. A method of preparing a set file describing commands of the installation by the host computer 21, sending to the terminal 23, and executing the installation automatically, is proposed.

FIG. 13 is an operational flow chart showing the automatic software installing process which is carried out using the set file. The software installing process shown in FIG. 13 is carried out after the sub-directory is created at the step S16 shown in FIG. 4.

The terminal 23 sends the number of an item of software, together with command RIS_INSTALL, to the host computer 21 (step S21). In response to this, the host computer 21 starts remote installation for the software, which corresponds to the number received. The remote installation is automatically carried out by exchanging information between the host computer 21 and the terminal 23, following an installing script 43 of "tetlis" created by the host computer 21 (step S22).

The host computer 21 replaces @SOUKO@ by SOUKODIR=D:¥SOUKO¥TET and down-loads file TET1.LZH to sub-directory D:¥SOUKO¥TET of the hard disk 25.

When it is informed by the terminal 23 that the down-load is finished (OK), the host computer 21 replaces @WINDIR@ by D:¥WINDOWS and down-loads VBRJP200.DLL to directory D:¥WINDOWS of the hard disk 25.

When it is informed by the terminal 23 that the down-load is finished (OK), the host computer 21 then replaces @SOUKO@ by SOUKO=D:¥SOUKO and down-loads a set file 44 (SETUP.INF) for the user A, which includes commands for processes to be conducted by the terminal 23, to directory D:¥SOUKO of the hard disk 25. At this time as seen at step S18, the host computer 21 re-writes information such as equipment type, SOUKO and WINDIR included in set file SETUP.INF as information for the user A, and sends them to the terminal 23 referring to the user's circumstance file 39. The set file SETUP.INF includes a series of processes, including decompressing file TET1.LZH, moving and re-naming file TOWNS.DRV and registering file TETRIS.EXE in the system.

When it is informed by the terminal 23 that the down-load is finished (OK), the host computer 21 sends instruction INSTALL D:¥SOUKO¥SETUP.INF, carrying out the automatic installation process to the terminal 23, according to commands contained in the set file SETUP.INF, to the terminal 23.

In response to this, the terminal 23 carries out the automatic installation process according to commands contained in set file SETUP.INF. It disconnects the communication line between the host computer 21 and itself, in response to the command LOG OFF. Thereafter, no communication fee is charged because the communication line 22 is not used. The file TET1.LZH is then decompressed to the above-mentioned four files TETRIS.EXE, TOWNS.DRV, PC98.DRV and MAC.DRV, responsive to command LHA X D:¥SOUKO¥TET¥TET 1. LZH.

The terminal 23 moves file TOWNS.DRV from directory D:¥SOUKO¥TET to D:¥WINDOWS, and changes the file name to FONT.DRV, in response to command MOVE D:¥SOUKO¥TET¥TOWNS.DRV D:¥WINDOWS¥FONT.DRV. File TETRIS.EXE is then converted to an icon and registered in the terminal 23, in response to the command ICON TETRIS.EXE The power source is then turned off, in response to the command POFF. The installation process is thus finished.

In the case of the automatic installing process, which is carried out using the set file, the host computer 21 cannot confirm the process, but the use efficiency of the communication line 22 can be increased by reducing the number of times the line 22 is used. Further, installing conditions such as the type of equipment have been resolved before the software is bought, thus the installing process can be carried out automatically.

FIG. 14 shows another example of the set file. In the set file shown in FIG. 14, [DstDirs] represents a list of file storing destinations and [Files] a list of files to be stored. They tell in this case that an execution file Soft2.Exe for software targeted by the user is stored in the directory D:¥RIS¥KOBUTA, and that the title of TOWNS.DRV, which is a driver for TOWNS, is changed to FONT.DRV and stored in directory D:¥WINDOWS¥SYSTEM.

When the set file is created, [DstDirs] is written as 1=SOUKODIR and 2=WINDIR, but when the host computer 21 actually obtains information of SOUKODIR and WINDIR, they are re-written as 1=D:¥RIS¥KOBUTA and 2=D:¥WINDOWS¥SYSTEM. Setting conditions in the set file can be dynamically or selectively changed in this manner.

According to the present invention, software targeted by the user can be automatically installed from the distribution center into the terminal equipment through the communication line. Further, software can also be sold to users through the communication line, when the present invention is employed.

The maintenance of distributed software is simplified because such software is stored in exclusive directories. Further, the user need not input a string of characters, designating the directory for the distributing destination, into the terminal.

The user can more efficiently select the target software on the screen of the terminal and can also select a method for installing his target software. Further, he need not check the operation circumstances of his target software because the circumstance check can be carried out automatically.

Still further, the number of times which the communication line is used can be reduced as much as possible when the software is installed.

What is claimed is:

1. A system for distributing software from a distribution center to a user's terminal equipment which is connected to said distribution center via a communication line, comprising:

contents storing means arranged in said terminal equipment and comprising an exclusive storing area as a distributing destination, the exclusive storing area being pointed by a directory and used exclusively for said software;

sending means for sending identification information of the directory in a predetermined communication protocol from the terminal equipment to the distribution center;

sub-directory generating means for automatically appointing a sub-directory of the directory in said exclusive storing area, corresponding to target software, after the target software to be distributed is decided, for sending identification information of said sub-directory in the communication protocol from the distribution center to the terminal equipment, and for automatically generating said sub-directory in said exclusive storing area; and installing means for distributing the target software to said sub-directory in said terminal equipment.

2. The system according to claim 1, further comprising: icon display means for displaying an icon, which corresponds to the target software, in an exclusive window which corresponds to said exclusive storing area.

3. The system according to claim 1, further comprising: keyword display means for displaying plural keywords in two or more hierarchies, and selecting means for causing a user to select one or more keywords corresponding to the target software, from said plural keywords displayed by said keyword display means and reporting said one or more keywords to said installing means, wherein said installing means retrieves the target software from plural software through said one or more keywords.

4. The system according to claim 3, wherein said keyword display means displays said plural keywords duplicated in said two or more hierarchies.

5. The system according to claim 3, further comprising: keyword storing means for holding said plural keywords related to the plural software.

6. The system according to claim 1, further comprising: circumstance information informing means for obtaining circumstance information relating to software operation circumstances in said terminal equipment and thereby reporting circumstance information to said distribution center; and circumstance check means for comparing circumstance information received from said circumstance information informing means with that of the target software, checking whether or not they are matched with each other, and reporting a check result thus obtained to said installing means, wherein said installing means determines whether or not the target software is to be distributed, and also determines a distributing method for the target software by responding to said check result.

7. The system according to claim 6, wherein said circumstance information informing means gets circumstance information involving operation circumstance information in said terminal equipment obtained at the time when said circumstance information informing means reports to said distributing center.

8. The system according to claim 1, further comprising:
   installing menu display means for displaying plural methods of installing the target software; and
   selecting means for causing users to select a specific installing method from plural installing methods displayed by said installing menu display means and reporting said specific installing method to said installing means, wherein said installing means installs the target software in said contents storing means according to said specific installing method.

9. The system according to claim 8, wherein said installing menu display means displays at least two of installing methods for registering the target software in a terminal equipment system, registering the target software installing program in said terminal equipment system, and downloading the target software to a terminal equipment.

10. The system according to claim 1, further comprising:
    automatic installing means for automatically installing the target software in said contents storing means, according to an installing order described in a setting file received from said installing means.

11. The system according to claim 10, wherein said installing means re-writes when needed, and sends setting file contents to said automatic installing means.

12. A terminal equipment comprising:
    keyword storing means for holding plural keywords related to plural software;
    keyword display means for displaying said plural keywords in two or more hierarchial levels including first and second levels, the keywords displayed in the second level including a part of the keywords displayed in the first level; and
    selecting means for causing a user to select one or more of the keywords corresponding to software to be distributed to said terminal equipment from said plural keywords displayed by said keyword display means.

13. A system for connecting a user terminal equipment to a distribution center via a communication line and distributing software from said distribution center to the terminal equipment, comprising:
    circumstance information informing means for obtaining circumstance information relating to software operation circumstances in the terminal equipment and reporting the circumstance information to said distribution center in a predetermined communication protocol;
    circumstance checking means for preparing a check script information including a description of an interaction in the communication protocol with the terminal equipment to check operation circumstances of user target software, comparing circumstance information received from said circumstance information informing means with the operation circumstances of the user target software according to the check script information, checking whether or not the operation circumstances of user target software match the circumstance information according to the check script information, and outputting a check result thus obtained; and installing means for determining whether or not the target software is to be distributed or determining a distributing method corresponding to said check result.

14. A system for connecting a user terminal equipment to a distribution center via a communication line and distributing software from said distribution center to the terminal equipment, comprising:

circumstance information informing means for obtaining circumstance information relating to software operation circumstances in the terminal equipment and reporting the circumstance information to said distribution center in a predetermined communication protocol;

circumstance checking means for preparing a check script information including a description of an interaction in the communication protocol with the terminal equipment to check operation circumstances of user target software, comparing circumstance information received from said circumstance information informing means with the operation circumstances of the user target software according to the check script information, checking whether or not the operation circumstances of user target software match the circumstance information according to the check script information, and outputting a check thus obtained;

installing menu display means for displaying plural installing methods for the target software according to the check result;

selecting means for causing a user to select a specific installing method from said plural installing methods displayed by said installing menu display means; and installing means for installing the target software in the terminal equipment according to the specific installing method selected.

15. A system for connecting a user terminal equipment to a distribution center via a communication line and distributing software from said distribution center to the terminal equipment, comprising:

circumstance information informing means for obtaining circumstance information relating to software operation circumstances in the terminal equipment and reporting the circumstance information to said distribution center in a predetermined communication protocol;

circumstance checking means for preparing a check script information including a description of an interaction in the communication protocol with the terminal equipment to check operation circumstances of user target software, comparing circumstance information received from said circumstance information informing means with the operation circumstances of the user target software according to the check script information, checking whether or not the operation circumstances of user target software match the circumstance information according to the check script information, and outputting a check thus obtained;

installing means for preparing a setting file for each user, in which an install procedure for the target software is described corresponding to the circumstance information of the terminal equipment, and sending said setting file to the terminal equipment when the target software is installed; and automatic installing means for automatically installing the target software in the terminal equipment, said automatic installing means performing an installation of the target software within the terminal equipment according to the install procedure in said setting file received.

16. A method for exchanging information between a distribution center and a user terminal equipment via a communication line and a distributing software from said distribution center to a terminal equipment, comprising the steps of:

(a) providing an exclusive storing area in a terminal equipment as a distributing destination exclusively used for software;

(b) sending identification information of the directory in a predetermined communication protocol from the terminal equipment to the distribution center;

(c) automatically appointing a sub-directory in said exclusive storing area, corresponding to target software, after the target software to be distributed is decided;

(d) automatically generating the appointed sub-directory in said terminal equipment;

(e) sending identification information of said sub-directory in the communication protocol from the distribution center to the terminal equipment, and (f) distributing the target software to the sub-directory thus created.

17. A method for exchanging information between a distribution center and a user terminal equipment via a communication line and a distributing software from said distribution center to a terminal equipment, comprising the steps of:

(a) setting plural keywords relating to plural software;

(b) displaying said plural keywords duplicated in two or more hierarchial levels including first and second levels, the keywords displayed in the second level including a part of the keywords displayed in the first level;

(c) selecting one or more keywords, which correspond to a target software to be distributed, from said plural keywords;

(d) retrieving the target software from plural software using said one or more keywords; and (e) distributing the target software thus obtained to said terminal equipment.

18. A method for exchanging information between a distribution center and a user terminal equipment via a communication line and a distributing software from said distribution center to a terminal equipment, comprising the steps of:

(a) obtaining circumstance information relating to software operation circumstances in said terminal equipment;

(b) reporting circumstance information to said distribution center in a predetermined communication protocol;

(c) preparing a check script information including a description of an interaction in the communication protocol with the terminal equipment to check operation circumstances of user target software;

(d) comparing reported circumstance information with the user's target software operation circumstances according to the check script information, checking whether or not the operation circumstances of user target software match the circumstance information according to the check script information, and outputting a check result thus obtained; and (e) deciding whether or not the target software is to be distributed or deciding a method of distributing the target software by responding to said check result obtained.

19. A method for exchanging information between a distribution center and a user terminal equipment via a communication line and distributing software from said distribution center to the terminal equipment, comprising the steps of:

(a) obtaining circumstance information relating to software operation circumstances in said terminal equipment;

(b) reporting circumstance information to said distribution center in a predetermined communication protocol;

(c) preparing a check script information including a description of an interaction in the communication protocol with the terminal equipment to check operation circumstances of user target software;

(d) comparing reported circumstance information with the user's target software operation circumstances according to the check script information, checking whether or not the operation circumstances of user target software match the circumstance information according to the check script information, and outputting a check result thus obtained;

(e) displaying plural installing method for target software according to the check result;

(f) selecting a specific installing method from plural installing methods displayed; and (g) installing the target software in said terminal equipment according to said specific installing method selected.

20. A method for exchanging information between a distribution center and a user terminal equipment via a communication line and distributing software from said distribution center to a terminal equipment, comprising steps of:

(a) obtaining circumstance information relating to software operation circumstances in said terminal equipment;

(b) reporting circumstance information to said distribution center in a predetermined communication protocol;

(c) preparing a check script information including a description of an interaction in the communication protocol with the terminal equipment to check operation circumstances of user target software;

(d) comparing reported circumstance information with the user's target software operation circumstances according to the check script information, checking whether or not the operation circumstances of user target software match the circumstance information according to the check script information, and outputting a check result thus obtained;

(e) preparing a setting file for each user in which an install procedure for the target software is described corresponding to the circumstance information of the terminal equipment;

(f) sending said setting file to said terminal equipment when the target software is installed; and (g) automatically installing the target software in the terminal equipment, the target software being installed within the terminal equipment according to the install procedure in said setting file received.

* * * * *